(12) United States Patent
Lagmanson

(10) Patent No.: US 6,404,203 B1
(45) Date of Patent: Jun. 11, 2002

(54) METHODS AND APPARATUS FOR MEASURING ELECTRICAL PROPERTIES OF A GROUND USING AN ELECTRODE CONFIGURABLE AS A TRANSMITTER OR RECEIVER

(75) Inventor: Mats Sven Bertilsooh Lagmanson, Austin, TX (US)

(73) Assignee: Advanced Geosciences, Inc., Austin, TX (US)

( * ) Notice: Subject to any disclaimer, the term of this patent is extended or adjusted under 35 U.S.C. 154(b) by 0 days.

(21) Appl. No.: 09/422,895

(22) Filed: Oct. 22, 1999

(51) Int. Cl.⁷ .............................. G01V 3/02; G01V 3/04
(52) U.S. Cl. ..................................... 324/362; 324/347
(58) Field of Search ................................ 324/357, 360, 324/362, 366, 364, 368, 339, 330, 691, 713, 715, 717, 72.5, 444, 439, 347

(56) References Cited

U.S. PATENT DOCUMENTS

| | | | |
|---|---|---|---|
| 3,810,000 A | * | 5/1974 | Aspinall et al. ............ 324/362 |
| 4,835,474 A | * | 5/1989 | Parra et al. ................. 324/363 |
| 4,942,361 A | * | 7/1990 | Gast et al. .................. 324/360 |
| 5,144,253 A | * | 9/1992 | Blanchard .................... 324/715 |

OTHER PUBLICATIONS

Sheriff, Encyclopedic Dictionary of Exploration Geophysics, third edition, ISBN–931830–47–8, p. 226, Fig. P–8; p. 229, Porous pot; p. 156, Induced polarization.
Telford et al., Applied Geophysics, second edition, ISBN 0–521–33938–3, pp. 578–610.
Ward (Ed.), Geotechnical and Environmental Geophysics, vol. 1: Review and Tutorial, ISBN 1–56080–000–3 (vol. 1), pp. 147–189.

* cited by examiner

*Primary Examiner*—Jay Patidar
*Assistant Examiner*—Subhash A Zaveri
(74) *Attorney, Agent, or Firm*—Fulbright & Jaworski, LLP

(57) ABSTRACT

An apparatus for measuring induced polarization of the ground. The apparatus includes a polarizable contact member configured to transmit a current to the ground. An electrode includes a first conductor and a second conductor. The first conductor is coupled to the polarizable contact member. A non-polarizable contact member is coupled to the second conductor of the electrode and is configured to measure an electrical potential associated with the current.

18 Claims, 3 Drawing Sheets

US 6,404,203 B1

METHODS AND APPARATUS FOR MEASURING ELECTRICAL PROPERTIES OF A GROUND USING AN ELECTRODE CONFIGURABLE AS A TRANSMITTER OR RECEIVER

BACKGROUND OF THE INVENTION

1. Field of the Invention

The present invention relates generally to the field of geophysical electrical measurements. More particularly, it concerns methods and apparatus for measuring an electrical property of the ground by utilizing a polarizable electrode for transmitting a current into the ground and a non-polarizable electrode for measuring a potential associated with that current.

2. Description of Related Art

Various geophysical applications utilize electrical surveys to determine a sub-ground resistivity distribution by making electrical measurements on the ground. From such measurements, the resistivity of the sub-ground may be estimated and related to various geological parameters such as mineral and fluid content, porosity, and water saturation.

Resistivity measurements are typically made by applying current directly into the ground using a pair of transmitting electrodes. Resulting potential differences may then be measured directly using several other receiving electrodes. The receiving electrodes are typically arranged in an array or grid.

Induced polarization relies upon the fact that current injected into the ground causes some materials to become polarized. The phenomenon of polarizing the ground is often referred to as chargeability. The type and amount of chargeability associated with the ground may be measured by taking time domain and/or frequency domain measurements. In general, such measurements determine the degree to which the ground has been polarized by comparing a source signal transmitted to the ground with a measured decay signal after the source signal has been shut off. One or more physical properties of the ground may be correlated with the degree of polarization.

There are two main types of induced polarization systems in use today. One is an automated system that has a distributed cable with multiple configurable electrodes on it that may be configured as transmitting or receiving electrodes. Each electrode typically contacts the ground with a single, metal-stake contact. In these systems, both the transmitting electrodes and the receiving electrodes use the same metal-stake contact. With regard to transmission of current, the metal-stake contacts are advantageous in that they exhibit low impedance with the ground and thus may provide a high level of injected current. Although advantageous in this regard, the receiving electrodes, however, are often hindered by the use of the metal-stake contact when measuring the decaying potential after the transmitted current is shut off. Without being bound by theory, it is believed that the use of the metal-stake contact may create a self potential between the stake and the ground. This self potential may interfere with the induced polarization level in the ground, which may negatively affect the accuracy of data being gathered. For at least this reason, it would be advantageous to provide the ability to measure the electrical potential of the ground using a contact member that does not create a self potential between itself and the ground.

Another type of induced polarization system currently utilizes a manual method a that employs a set jig having multiple receiving electrodes on it that are made of either non-polarizing or polarizing material. Although systems of this type have shown some degree of utility for measuring electrical properties of the ground, they suffer disadvantages including the fact that they are often tedious to set up and measurements often take a long time. Therefore, it would be advantageous to provide for the ability to measure an electrical property of the ground using an automated system which is easy to set up and which may make measurements in a short period of time.

SUMMARY OF THE INVENTION

In one respect, the invention is an apparatus for measuring an electrical property of a ground. As used herein, the indefinite articles "a" and "an" are to connote "one or more" unless otherwise noted. As used herein, by "ground," it is meant any surface or sub-surface for which an electrical property may be measured. "Ground" may refer to, but is not limited to, the surface of the earth, surface of lakes, rivers, oceans, bottoms of lakes, rivers, oceans, holes, and/or any man-made structures. The apparatus includes a first contact member, an electrode, and a second contact member. The first contact member is configured to transmit a current to the ground. The electrode includes a first conductor and a second conductor. The first conductor is coupled to the first contact member and is configured to transmit the current through the contact member to the ground. The second contact member is coupled to the second conductor and is configured to measure an electrical potential associated with the current. As used herein, by "electrical potential," it is meant any potential. For example, "electrical potential" applies to, but is not limited to, potentials associated with, for instance, resistivity and/or induced polarization.

In other respects, the electrical property may include resistivity. The electrical property may include induced polarization. The first contact member may be polarizable and the second contact member may be non-polarizable. The first contact member may include a metal stake and the second contact member may include a non-polarizable electrode. The first contact member may include a metal stake. The metal stake may include a conducting ledge configured to secure the electrode. The apparatus may also include a resistivity meter coupled to the electrode and configured to record the electrical potential. The apparatus may also include an interface box coupled between the resistivity meter and the electrode. The electrode may be within a Wenner alpha array, a Wenner beta array, a Wenner gamma array, a pole-pole array, a dipole-dipole array, a pole-dipole array, a Wenner array, a Schlumberger array, an equatorial dipole-dipole array, or any combination thereof.

In another respect, the invention is a system for measuring induced polarization of a ground. The system includes a polarizable contact member, an electrode, a non-polarizable contact member, and a resistivity meter. The polarizable contact member is configured to transmit a current to the ground. The electrode includes a first conductor and a second conductor. The first conductor is coupled to the polarizable contact member and is configured to transmit the current through the polarizable contact member to the ground. The non-polarizable contact member is coupled to the second conductor and is configured to measure an electrical potential associated with the current. The resistivity meter is coupled to the electrode and is configured to record the electrical potential.

In other respects, the system may also include an interface box coupled between the resistivity meter and the electrode.

The system may also include software configured to render a map of the ground from the electrical potential recorded by the resistivity meter. The electrode may be within a Wenner alpha array, a Wenner beta array, a Wenner gamma array, a pole-pole array, a dipole-dipole array, a pole-dipole array, a Wenner array, a Schlumberger array, an equatorial dipole-dipole array, or any combination thereof.

In another respect, the invention is a method for measuring an electrical property of a ground. The method includes delivering a current to the ground through an electrode and a polarizable contact member, the electrode including a first and a second conductor, and the first conductor being coupled to the polarizable contact member. An electrical potential associated with the current is measured with a non-polarizable contact member coupled to the second conductor, and the electrical potential is recorded with a resistivity meter coupled to the electrode.

In other respects, the electrical property may include resistivity. The electrical property may include induced polarization. The electrode may be within an array, and wherein the measuring comprises a Wenner alpha measurement, a Wenner beta measurement, a Wenner gamma measurement, a pole-pole measurement, a dipole-dipole measurement, a pole-dipole measurement, a Wenner measurement, a Schliumberger measurement, an equatorial dipole-dipole measurement, or any combination thereof. The method may also include rendering a map of the ground from the electrical potential recorded by the resistivity meter.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

The presently disclosed methods, systems, and apparatus allow for the use of a single electrode or groups of electrodes for measuring electrical properties of the ground with high accuracy and facile operation. The single electrode or groups of electrodes disclosed herein greatly improve automated systems in use today by providing a non-polarizing contact for receiving and measuring an electrical potential and a low impedance polarizing contact for transmitting a current to the ground being measured. Utilizing a single electrode having both a polarizing and non-polarizing contact provides a configurable electrode that may operate as a transmitter or receiver, while avoiding the creation of a harmful potential between itself and the ground. When the electrode is configured as a transmitting electrode, it may use a low impedance, polarizing contact to inject current into the ground. When it is configured as a receiving electrode, it may use a non-polarizing contact to measure a potential level associated with the injected current. Thus, the presently disclosed methodology allows for a configurable electrode that may have contact to the ground by means of either a non-polarizing medium or a polarizing medium, depending on whether it is configured as a receiving electrode or a transmitting electrode. The use of such an electrode allows for greater resolution and accuracy in characterizing the ground and its associate electrical properties.

Applications for the presently disclosed methods, systems, and apparatus are vast. For instance, the electrode methodology disclosed herein may be used to measure the ground's resistivity and/or induced polarization. The resistivity and induced polarization information obtained from the techniques described herein provide for many different types of geophysical surveying. For example, resistivity and/or induced polarization data may be used for mineral exploration surveys, engineering surveys, environmental surveys, and/or other applications, as is known in the art. More specifically, data obtained using the method and apparatus of the present disclosure may be used to, among other things, investigate whether certain underground material includes clay or conductive ground water.

Figure 1:
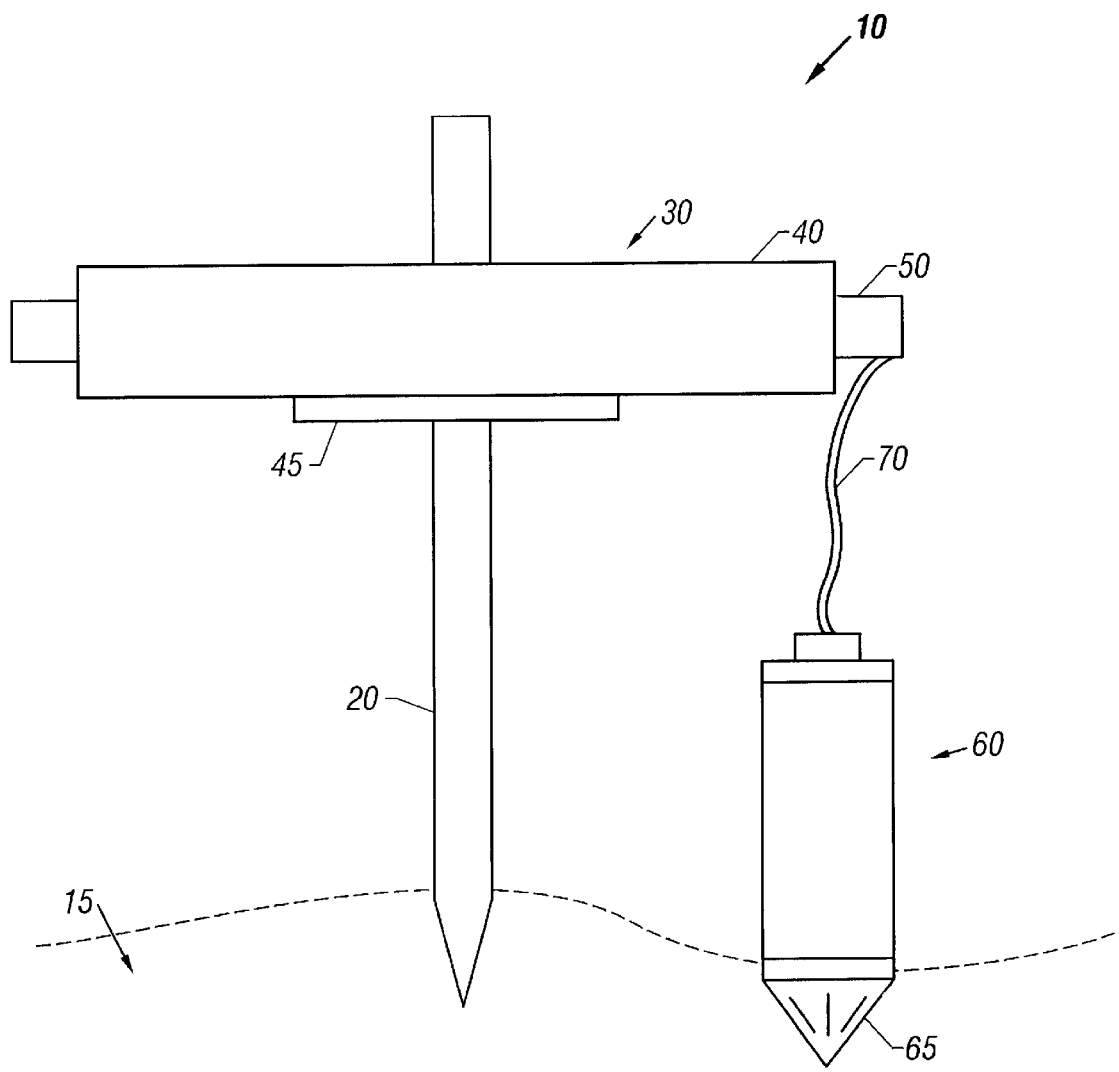
FIG. 1 is a schematic diagram showing an apparatus for measuring electrical properties of the ground according to one embodiment of the present disclosure.

Turning first to FIG. 1, there is shown an apparatus 10 for measuring an electrical property of the ground 15. The apparatus includes a first contact member 20, an electrode 30, and a second contact member 60. In one embodiment, first contact member 20 is a polarizable contact, which may be a metal stake. The metal stake may, in one embodiment be a stainless-steel stake. In other embodiments, first contact member 20 may be made from various different materials. For instance first contact member 20 may include conducting polarizable materials such as copper, aluminum, iron, lead, steel, or any combination thereof. In general, first contact member 20 may be made of any material suitable for transmitting a current to and/or within ground 15. In the illustrated embodiment, contact member 20 may be about 18 inches long, although it will be understood that any length suitable for a particular application may be utilized according to the teachings of the present disclosure. In the illustrated embodiment, first contact member 20 may be seen to include a pointed end. The pointed end facilitates the insertion of first contact member 20 into ground 15. Other embodiments may utilize a flat or rounded end which may be adapted for insertion into the ground to be measured. Other embodiments may utilize appropriate coatings and/or coverings to prevent rust, corrosion, or the like. Coatings may also be utilized to affect the conductive properties of first contact member 20. In the illustrated embodiment, first contact member 20 includes a conducting ledge 45. Conducting ledge 45 may be coupled to first contact member 20 or may be formed integrally therewith. In the illustrated embodiment, conducting ledge 45 is made by welding a rectangular section of stainless-steel directly to a stainless steel stake that forms first contact member 20. In other embodiments, any material conductive to the flow of the electrons may be used to make conducting ledge 45. Conducting ledge 45 may be coupled to first contact member 20 by any method known in the art including, but not limited to, soldering, welding, or brazing.

As illustrated in FIG. 1, apparatus 10 may include an electrode 30. Electrode 30 may include a first conductor 40 and a second conductor 50. First conductor may be coupled to first contact member 20. In one embodiment, first conductor 40 may be configured to transmit current through first contact member 20 into and/or on ground 15. In the illustrated embodiment, first conductor 40 may be made from stainless-steel. However, in other embodiments, any material suitable for conducting electrons may be substituted therewith. In particular, other embodiments may utilize materials such as, but not limited to, copper, aluminum, iron, lead, steel, or combinations thereof.

In one embodiment, first conductor 40 may be configured to house one or more electronic switches. The electronic switches may be used to route electrical signals to and from specific electrodes 30 that are, for instance, arranged in an array or grid. More specifically, electrical switches housed within first conductor 40 may be utilized so that different measurement schemes may be used to measure an electrical property of the ground. Even more specifically, the switches housed within first electrode 40 may be controlled in such a way so that Wenner alpha measurements, Wenner beta measurements, Wenner gamma measurements, pole-pole measurements, dipole-dipole measurements, pole-dipole measurements, Wenner measurements, Schlumberger measurements, equitorial-dipole-dipole measurements, or any combination thereof may be performed, as is known in the art. With the benefit of the present disclosure, those of skill in the art will recognize that techniques described herein are not limited to measurement techniques known in the art but may be applied to, for instance, any type of measurement utilizing any type of electrode combination.

Electrode 30, in the illustrated embodiment, also may include second conductor 50. Second conductor 50 may be made from any suitable conducting material including, but not limited to stainless steel. In one embodiment, second electrode 50 may be attached to electrode 30 by non-conductive means. In the illustrated embodiment, second conductor 50 may be about 0.5 inches by about 0.75 inches, but it will be understood by those having skill in the art that any other suitable size may be utilized.

In FIG. 1, there is shown a second contact member 60. In one embodiment, second contact member 60 is a non-polarizable electrode. Second contact member 60 may be coupled to second conductor 50 with wire 70. In one embodiment, wire 70 may be made from insulated copper wire. However, in other embodiments, any conductive media suitable for transmitting a current to and from second contact member 60 may be used. In the illustrated embodiment, second contact member 60 may be coupled to second conductor 50 by means of a conducting clip. In other embodiments, however, any connection device or methodology may be utilized to form a connection between second conductor 50 and second contact member 60.

In embodiments utilizing a non-polarizable electrode for second contact member 60, the non-polarizable electrode may include a ceramic tip 65. The non-polarizable electrode, which may also be referred to as a porous pot, may be an electrode that allows free ionic flow into the ground. Non-polarizable electrodes may be used in making voltage measurements where negligible current flows through it. Such an electrode may include a metal electrode in a solution of its own salt. Suitable metals and salts include, but are not limited to, copper/copper sulfate, silver/silver chloride, lead/lead chloride, zinc/zinc sulfate, cadmium/cadmium chloride or other metals and like-metal salts. A copper rod in a saturated copper-sulfate solution contained in a chamber with a porous surface, where the porous surface is intended for contact to the measurement surface is one example of such an electrode.

In one embodiment, second contact member 60 may be equipped with a cover, such as a vinyl cover, to cover tip 65 in order to prevent moisture loss when second contact member 60 is not in use. Second contact member 60 may be approximately 135 mm in length and about 34 mm in diameter. However, with the benefit of the present disclosure, those having skill in the art will recognize that any size of second contact member 60 may utilized according to, for instance, a particular application. A nonpolarizable electrode suitable for use with the methodology described herein is available commercially from Advanced Geosciences, Inc. (Austin, Tex., USA).

Apparatus 10 may operate in the following manner when configured in transmitting mode. One or more electrical signals may be applied to a switchable electrode 30 from an appropriate current generating device such as an automatic memory resistivity meter (which is described below with reference to FIG. 2). In transmission mode, the one or more signals travel along and through first conductor 40, through conducting ledge 45, and through first contact member 20 to be injected into ground 15. The injected current creates an associated potential within and on the ground.

When configured in receiving mode, apparatus 10 may operate as follows. Second contact member 60 may be positioned within ground 15 with pointed tip 65. An electrical potential associated with an injected current from a transmitting electrode may be measured via second contact member 60. The measured electrical potential may be transmitted through wire 70 to second conductor 50 and through second conductor 40 to an appropriate meter or recording device (such as an automatic memory resistivity meter, which is described below with reference to FIG. 2) so that data may be gathered and analyzed.

Figure 2:
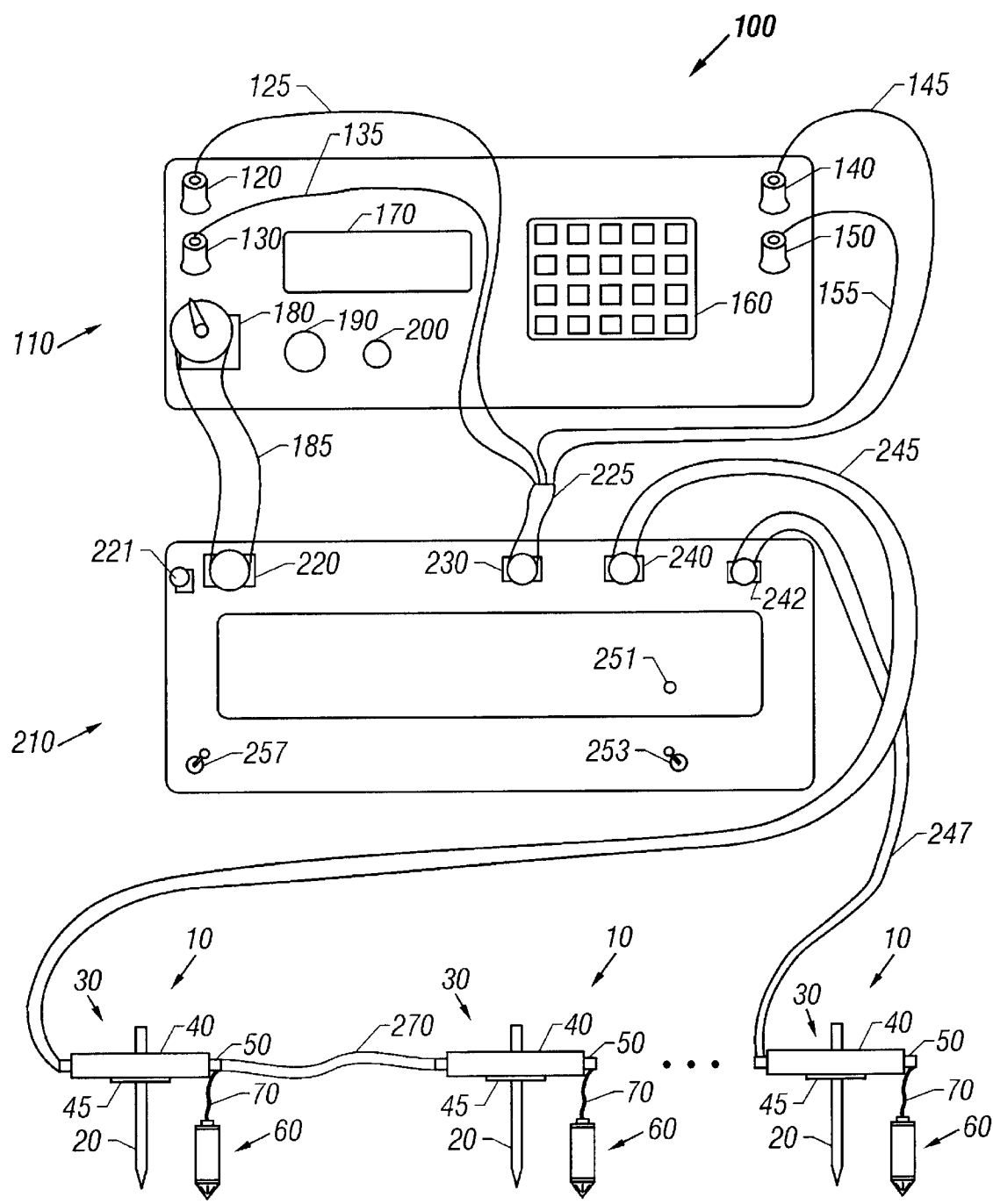
FIG. 2 is a schematic drawing of a system for measuring electrical properties of the ground according to one embodiment of the present disclosure.

Turning now to FIG. 2, there is shown a system 100 for measuring electrical properties of the ground. In the illustrated embodiment, system 100 includes a resistivity meter 110, an optional interface box 210, and an array or grid (the continuation of which is indicated by the ellipsis in FIG. 2) of apparatus 10. Although the size of the array may vary widely, in one embodiment, arrays of about 50 electrodes may be used. In other embodiments, anywhere from about 10 to about 1000 electrodes may prove to be useful to survey different grounds.

In one embodiment resistivity meter 110 includes transmission terminals 120 and 130 and receiving terminals 140 and 150. A resistivity meter suitable for use with the methodology described herein is available commercially from Advanced Geosciences, Inc. (Austin, Tex., USA). As illustrated, the transmission and receiving terminals may be configured to accept wires coupled from resistivity meter 110 to interface box 210, which in turn may be coupled to apparatus 10 in the field. In one embodiment, transmission terminals 120 and 130 may be configured so that wires 125 and 135 are coupled to a pair of transmitting electrodes 30, which are coupled to, in one embodiment, a polarizable first contact member 20. In such an embodiment, receiving terminals 140 and 150 may be configured so that wires 145 and 155 are coupled to a pair or many pairs of receiving electrodes 30, which are coupled to, in one embodiment, a non-polarizable second contact member 60. Wires 125, 135, 145, and 155 may be any wires suitable for carrying a current. In one embodiment, wires 125, 135, 145, and 155 may be insulated copper wire.

As is known in the art, switching elements suitable to route current from wires 125, 135, 145, and 155 may be housed within electrodes 30 so that current from those wires may be delivered by wires 125 and 135 to appropriate transmitting electrodes so that a specified array measurement may be performed. Likewise, switching elements may be housed within electrodes 30 so that voltage signals may be delivered from appropriate receiving electrodes so that a specified array measurement may be performed.

In an automated system, a large number of electrodes may be placed in an array or grid. The electrodes may be coupled to a measuring instrument by one or several cables containing several individual conductors. At any given time during a survey any electrode station may have the function of being a transmitting electrode or a receiving electrode. When measuring the induced polarization effect from the ground, it is often beneficial to use low noise non-polarizable electrodes; however, those electrodes are not suitable for use as current electrodes. With the benefit of the present disclosure, it is possible to set out a large number of electrodes, where each electrode location includes a combination of a polarizable electrode and a non-polarizable electrode, as is shown in FIG. 1. During a survey, electrode 30 and a polarizable contact member, which may be first contact member 20, may automatically be used for current injection while a non-polarizable contact member, which may be second contact member 60 may be used potential measurements. Thus, with the benefit of the present disclosure, a low noise non-polarizable contact member may be used in a multi-electrode automatic system for each potential measurement, and the quality of the resulting data may thus be improved significantly over techniques currently in use.

In one embodiment, resistivity meter 110 includes a communications port 180. As illustrated, communications port 180 may couple to interface box 210 via wires 185. As is known in the art, communications port 180 may be configured to control appropriate switching elements within, for instance, electrodes 30 so that a specified array measurement may be performed. For instance, communications port 180 may be configured to switch electrodes 30 in such a way so that a dipole-dipole electrical measurement is performed using a specified number of apparatus 10. Communication port 180 may be used to send commands to electrode 30 so that switching electronics housed within electrode 30 may set the electrode to either send out a current through first contact member 20, measure a voltage through second contact member 60, or not participate at all in the current measurement.

In one embodiment, resistivity meter 110 includes a key pad 160. Key pad 160 may be used to set instrument parameters such as electrode array type to be used, current to be sent out, the number of measurements to take at each electrode combination, error threshold, feet or meter units, time constant for measurement, voltage mode, IP/resistivity or resistivity measurement, built-in survey program or user-programmed survey, time setting, date setting, check battery, communication control to computer, electrode switch addresses in use, auto mode, external computer mode, off mode, contact resistance test, cable test, relay test, and/or electrode spacing. With the benefit of the present disclosure, those of skill in the art will recognize that key pad 160 may be utilized for several other functions.

In one embodiment, resistivity meter 110 includes a display 170. Display 170 may be used for communication between an operator and the instrument. In particular, the display may show instrument settings, mode of operation, date, time, battery voltage, data in memory, test results, and measurement results. With the benefit of the present disclosure, those of skill in the art will recognize that display 170 may be utilized for several other functions.

As illustrated in FIG. 2, resistivity meter 110 may include an on/off switch 190 and a night-light contact 200. On/off switch 190 may be used to power on or off meter 110. Night-light contact 200 may be used to illuminate the display during low light conditions.

In the embodiment illustrated in FIG. 2, interface box 210 includes a communications port 220. With the benefit of the present disclosure, those having skill in the art will recognize that techniques described herein may be performed without the use of interface box 210. In such embodiments, apparatus 10 may be utilized with, for instance, a resistivity meter or other device without utilizing interface box 210. In embodiments using interface box 210, however, a communications port 220 may be coupled to the corresponding communications port 180 of resistivity meter 110. As described earlier, these communications ports, as is known in the art, may allow for appropriate signal switching within apparatus 10 so that a specified array measurement may be automatically performed in the field to measure electrical properties of ground 15.

Interface box 210 may also include personal computer port 221. This port may be configured to connect a personal computer to the system; in such case, the personal computer may be used to control the system and may be utilized for storage of voltage data obtained during a survey. Interface box 210 may also include switch 257, which may be configured to select between personal computer mode (a mode in which a personal computer is coupled to personal computer port 221) or resistivity instrument mode (a mode lacking a personal computer coupled to the instrument).

Interface box 210 may include transmitter/receiver port 230, first transmitter/receiver/communications port 240, and second transmitter/receiver/communications port 242. As illustrated, transmitter/receiver port 230 may be configured to accept wires 125, 135, 145, and 155 from resistivity meter 110. In one embodiment transmitter/receiver port 230 may accept wires 125, 135, 145, and 155 as a single unit. For instance, wires 125, 135, 145, and 155 may form individual conducting elements within a single, larger wire as is illustrated in FIG. 2. The larger wire 225 may be coupled to port 230. Transmitter/receiver/communications ports 240 and 242 may be configured to route signals from wires 125, 135, 145, and 155 from interface box 210, via wires 245 and 247, to and from apparatus 10 in the field. As illustrated, wires 245 and 247 may be coupled to a conductor 30, which may be in turn coupled to other conductors 30 (via wire 270) that may be arranged in an array or grid. In one embodiment, second port 242 may not be utilized. In such an embodiment, port 240 could be configured to route the signals to the field.

Interface box 210 may include an on/off switch 253 for powering the interface on or off. Further, it may include, in one embodiment, a light 251 to indicate whether or not the unit is on or off. An interface box suitable for use with the methodology described herein is available commercially from Advanced Geosciences, Inc. (Austin, Tex., USA).

In one embodiment, operation of system 100 may be as follows. This description assumes that at least one working command file has been loaded into the memory of resistivity meter 110, as is within the knowledge of those of skill in the art, prior to the survey. First contact members 20 may be placed in the ground at equal, or non-equal spacing. Wires 245 and 270 may be laid out appropriately. Cables may be set forth so that electrodes 30 may be numbered in sequence (i.e., 1, 2, 3 . . . 27, 28, 29 . . . ). Each electrode 30 may be coupled (e.g., rubber-banded) to its corresponding first contact member 20. Resistivity meter 110 and interface box 210 may be selected in the middle of the transmitter/receiver/communication cable lay-out or at any other convenient position. Wires 245 and 270 may be connected to the transmitter/receiver/communication port 240 and/or port 242 of interface box 210. The transmitter/receiver port 230 on interface box 210 may be connected to terminals 120, 130, 140 and 150 on resistivity meter 110 using wire 225. Resistivity meter 110 and interface box 210 may be coupled between communications port 180 on resistivity meter 110 and the communications port 220 on interface box 210 using wire 185. In automatic survey embodiments, it may be beneficial to use a 12 V DC external battery coupled to wire 185. The resistivity meter 110 and interface box 210 may be turned on. Switch 257 may be set on interface box 210 to select personal computer or resistivity meter mode. In embodiments utilizing a commercially available resistivity meter from Advanced Geosciences, Inc. (Austin, Tex., USA), one may go to menu 3 and use F3, then F1, then . (dot) to erase the data memory prior to taking survey, making sure that any previously recorded important readings in the memory are downloaded to a computer prior to erasing the memory, and making sure not erase the USER RAM memory. One may then go to menu 6 and press F3 to check that the electrode 30 addresses correspond to the actual electrode addresses. Then, one may press the MEN-key, and go to menu 8 and press F2 to select the User Mode. The +/−keys may be used to select the appropriate command file, for example Sch3m (a pre-prepared Schlumberger command file using 3 meter spacing). The selection may be chosen by pressing the F3-key. The x-and y-coordinate for the first electrode (in most cases 0,0) may then be entered by pressing F3. On menu 8, F3 and then F1 may be pressed to select IP (Induced Polarization) mode. On menu 8, F3 and then F2 may be pressed to select potential measurements with nonpolarizable contact members. A contact resistance test may then be run (Menu 7/F1). This test may be used to measure contact resistance along the profile. With equidistant electrode spacing along the profile, one may expect similar ground/contact resistance along the profile. If any of the readings show a significantly larger value, or if the test stops with an error code, one may choose to check that the first contact member 20 makes good contact to the ground 15 and that the electrode 30 makes proper contact with the first contact member 20. If the contact resistance is high because of local soil conditions, it may help to pour some salt water on the ground where the electrode is planted. It may be beneficial to get the contact resistance below 2k. After problems (if any) have been solved, the test may be restarted from a station by pressing the F1 key. Pressing F2 will restart the test, starting after the station with the problem. On menu 8, F3 and then F2 may then be pressed to select potential measurements with non-polarizable contact members. The actual surveying measurement may be started by pressing the MEA-key. The resistivity meter 110 will run through a complete survey. The measurement is indicated as being completed when the instrument stops at the last reading and displays "Ready." To record a new profile, the equipment may be moved, the data may be downloaded to a computer, the memory may be erased, and these, or other appropriate instructions may be followed.

Those having skill in the art will recognize that the above description is but one specific embodiment based upon a commercial resistivity meter known in the art. However, it will be understood that similar functions may be achieved with many different types of meters and systems. For instance, another device may be used to control electrodes 30 in the field, another device may be used to store potential data, another device may be used to control switching of electrodes, another device may be used to interface equipment, another device may be used to enter a surveying program, etc. In particular, those having skill in the art will recognize that many other systems may be purchased and/or built without undue experimentation to suitably control electrodes for that may be used in conjunction with the present disclosure.

Figure 3:
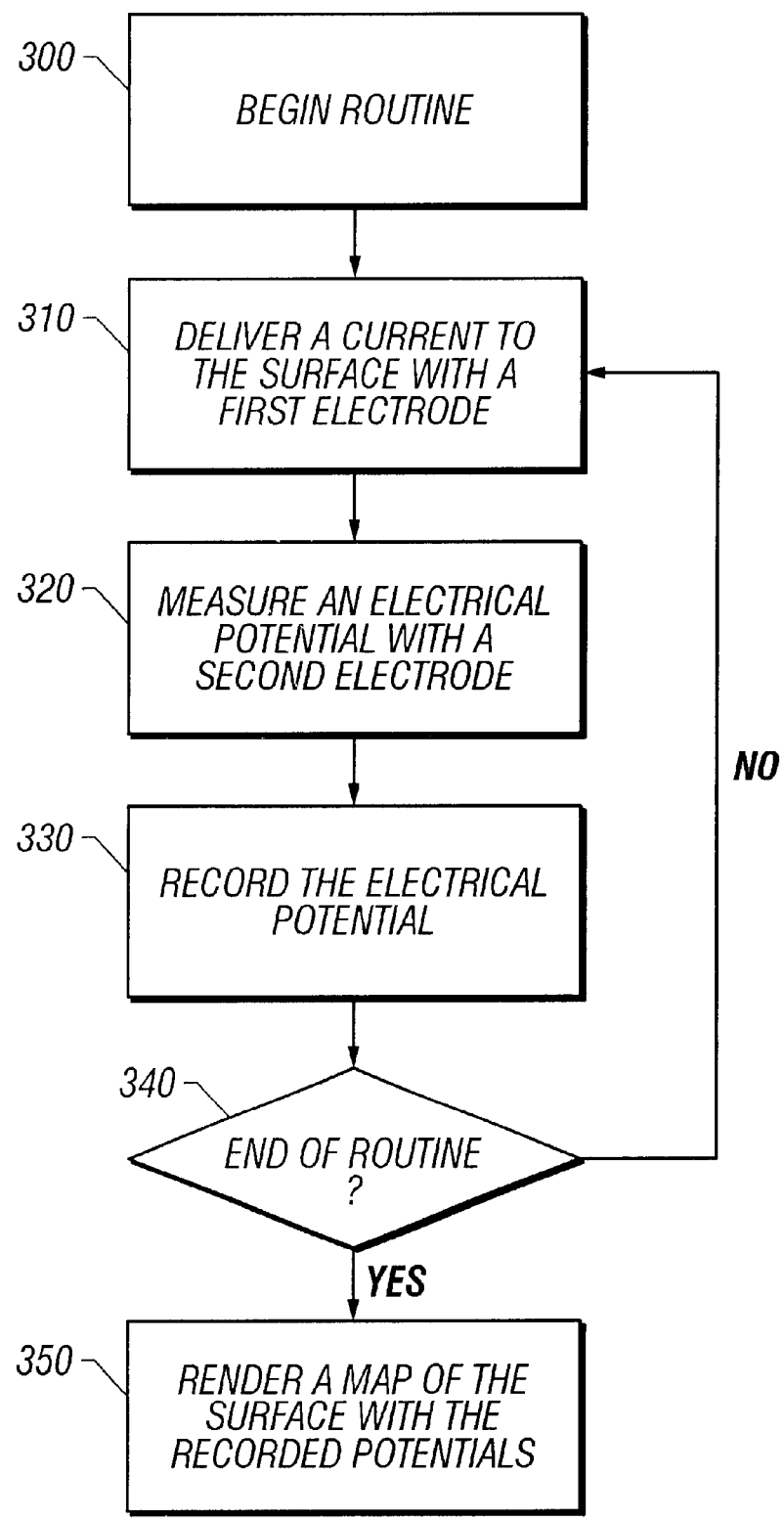
FIG. 3 is a flow chart showing a method for measuring electrical properties of the ground according to one embodiment of the present disclosure.

Turning now to FIG. 3, there is shown a flowchart outlining steps according to one embodiment of the present disclosure for measuring electrical properties of the ground. In step 300, a routine is begun. By this, it is meant that a user enters into resistivity meter 110, or another appropriate device such as a laptop or desktop computer, a specified array measurement to be performed. For instance, one may specify that a dipole-dipole measurement is to be performed utilizing, for instance, 50 electrodes. Again, depending upon the application and the resolution desired, more or fewer electrodes may be used, as is known in the art. The routine referred to in step 300 may be entered by methods known in the art. For instance, dipole-dipole, pole-dipole, pole-pole, Wenner, or Schlumberger electrode array methods may be entered.

In step 310, a current is delivered to and into ground 15 (see FIG. 1) with an electrode 30 (see FIG. 1). Specifically, a pair of electrodes 30 may be configured as transmitting electrodes. Appropriate switching elements within electrodes 30 may be switched so that one or more signals from wires 125 and 135 (See FIG. 2) may be routed to electrodes associated with the routine specified in step 300. For instance, if a dipole-dipole measurement has been specified, switching elements may be activated so that appropriate electrodes 30 may serve as transmitters to achieve such a dipole-dipole measurement. In one embodiment, switching elements within electrodes 30 may be configured to ensure that transmitting electrodes utilize a polarizable first contact member 20. Specifically, current may be injected into ground 15 (See FIG. 1) via a stainless steel stake acting as first contact member 20. Such a stake advantageously allows for the injection of high amounts of current. Although the amount of current delivered may vary widely according to application and/or ground characteristics, in one embodiment, about 200 mAmps may be applied to the ground, although it is contemplated that a range from about 1 mAmp to about 2 Amps may also be useful.

In step 320, an electrical potential associated with the injected current is measured from ground 15 (See FIG. 1). Specifically, a pair of electrodes 30 may be configured as receiving electrodes. Appropriate switching elements within electrodes 30 may be switched so that one or more signals from wires 145 and 155 (See FIG. 2) may be routed from electrodes associated with the routine specified in step 300. For instance, if a dipole-dipole measurement has been specified, switching elements may be activated so that appropriate electrodes 30 may serve as receivers to achieve such a dipole-dipole measurement. In one embodiment, switching elements within electrodes 30 may be configured to ensure that receiving electrodes utilize a non-polarizable second contact member 60, such as a non-polarizable electrode. Specifically, current may be injected into ground 15 (See FIG. 1) via a stainless steel stake acting as first contact member 20 and received via a non-polarizable electrode acting as second contact member 60. Such a non-polarizable electrode advantageously allows for the measurement of potential without creating a self potential between the ground and the receiving contact member. Thus, such an embodiment may allow for the generation of more accurate surveying data, free from deleterious effects associated with self potential.

In step 330, the electrical potential measured in step 320 may be recorded. In one embodiment, resistivity meter 110 may be used to store the potential data. Different types of potential data (e.g., resistivity and IP) may be stored in an internal memory of resistivity meter 110 or on a computer if a computer has been coupled to interface box 210 during the measurement. If no computer has been used, software may be used, as is known in the art, to transfer the voltage data from the resistivity meter 110 to the memory (e.g., hard-drive, optical drive, tape drive) of a computer. The data may be converted to an appropriate format for analysis software, as is known in the art. Inversion software may then be utilized to produce a final electrical resistivity and induce polarization cross-section, as is known in the art.

In step 340, it is determined whether the routine begun in step 300 has been completed. For instance, this step may determine if the measured potential in step 320 corresponds to the very last array measurement for the specified routine. If, indeed the measured potential corresponds to the final electrode measurement of the routine, control may be routed to step 350. However, if the routine is still underway, control may be routed back to step 310 so that another electrical current may be applied to ground 15 (See FIG. 1) according to the routine in step 300.

In step 350, a map of ground 15 (See FIG. 1) may be rendered using the potentials recorded in steps 320 and 330. In one embodiment, such a map is generated by invoking the raw recorded data and then contouring and coloring the inverted data with appropriate software, as is known in the art.

Those of skill in the art should, in light of the present disclosure, appreciate that many changes may be made in the specific embodiments which are disclosed and still obtain a like or similar result without departing from the spirit and scope of the invention. For instance, although the examples herein may function with commercial resistivity meters, interface boxes, and software currently available, it will be understood by those of skill in the art that the apparatus and methods described herein may be utilized with meters, boxes, software, and other equipment that may constitute improvements to such currently-available equipment. Specifically, examples described herein may be applied to both current and future equipment such as, but not limited, to resistivity meters, interface boxes, and software.

All of the methods, systems, and apparatus disclosed and claimed herein may be made and executed without undue experimentation in light of the present disclosure. Again, while the techniques of this invention have been described in terms of specific embodiments, it will be apparent to those of skill in the art that variations may be applied to the methodology and in the steps or in the sequence of steps of the method described herein without departing from the concept, spirit and scope of the invention.

REFERENCES

The following references, to the extent that they provide exemplary procedural or other details supplementary to those set forth herein, are specifically incorporated herein by reference.
1. Ward, Stanley H. (editor). Geotechnical and Environmental Geophysics, volume 1: Review and Tutorial, ISBN 1-56080-000-3 (volume 1), pages 147–189.
2. Telford, W. M; Geldart, L. P.; Sheriff, R. E. Applied Geophysics, second edition, ISBN 0-521-33938-3, pages 578–610.
3. Sheriff, Robert. Encyclopedic Dictionary of Exploration Geophysics, third edition, ISBN 0-931830-47-8, page 226 FIG. P-8, page 229 Porous pot, page 156 Induced Polarization.

What is claimed is:

1. An apparatus for measuring an electrical property of a ground, comprising:
   a first contact member;
   a single electrode configurable as a transmitter or receiver, the electrode comprising a first conductor coupled to a second conductor, the first conductor coupled to the first contact member and configured to transmit current through the contact member to the ground when the electrode is configured as a transmitter; and
   a second contact member coupled to the second conductor and configured to measure an electrical potential when the electrode is configured as a receiver.

2. The apparatus of claim 1, wherein the electrical property comprises resistivity.

3. The apparatus of claim 1, wherein the electrical property comprises induced polarization.

4. The apparatus of claim 1, wherein the first contact member is polarizable and wherein the second contact member is non-polarizable.

5. The apparatus of claim 4, wherein the first contact member comprises a metal stake and wherein the second contact member comprises a non-polarizable electrode.

6. The apparatus of claim 5, wherein the metal stake comprises a conducting ledge configured to secure the electrode.

7. The apparatus of claim 1, further comprising a resistivity meter coupled to the electrode and configured to record the electrical potential.

8. The apparatus of claim 7, further comprising an interface box coupled between the resistivity meter and the electrode.

9. The apparatus of claim 1, the electrode being within a Wenner alpha array, a Wenner beta array, a Wenner gamma array, a pole-pole array, a dipole-dipole array, a pole-dipole array, a Wenner array, a Schlumberger array, an equatorial dipole-dipole array, or any combination thereof.

10. A system for measuring induced polarization of a ground, comprising:
    a polarizable contact member;
    a single electrode configurable as a transmitter or receiver, the electrode comprising a first conductor coupled to a second conductor, the first conductor coupled to the polarizable contact member and configured to transmit current through the polarizable contact member to the ground when the electrode is configured as a transmitter;
    a non-polarizable contact member coupled to the second conductor and configured to measure an electrical potential when the electrode is configured as a receiver; and
    a resistivity meter coupled to the electrode and configured to record the electrical potential.

11. The system of claim 10, further comprising an interface box coupled between the resistivity meter and the electrode.

12. The system of claim 10, further comprising software configured to render a map of the ground from the electrical potential recorded by the resistivity meter.

13. The system of claim 10, the electrode being within a Wenner alpha array, a Wenner beta array, a Wenner gamma array, a pole-pole array, a dipole-dipole array, a pole-dipole array, a Wenner array, a Schlumberger array, an equatorial dipole-dipole array, or any combination thereof.

14. A method for measuring an electrical property of a ground, comprising:

providing a set of electrodes, each electrode including a polarizable contact member coupled to a first conductor of the electrode and a non-polarizable contact member coupled to a second conductor of the electrode, each electrode being configurable as a transmitter or receiver;

delivering a current to the ground through the polarizable contract member of an electrode configured as a transmitter;

measuring an electrical potential associated with the current with the non-polarizable contact member of an electrode configured as a receiver; and recording the electrical potential with a resistivity meter coupled to the electrode.

15. The method of claim 14, wherein the electrical property comprises resistivity.

16. The method of claim 14, wherein the electrical property comprises induced polarization.

17. The method of claim 14, the set of electrodes being within an array, and wherein the measuring comprises a Wenner alpha measurement, a Wenner beta measurement, a Wenner gamma measurement, a pole-pole measurement, a dipole-dipole measurement, a pole-dipole measurement, a Wenner measurement, a Schlumberger measurement, an equatorial dipole-dipole measurement, or any combination thereof.

18. The method of claim 14, further comprising rendering a map of the ground from the electrical potential recorded by the resistivity meter.

* * * * *

UNITED STATES PATENT AND TRADEMARK OFFICE
CERTIFICATE OF CORRECTION

PATENT NO. : 6,404,203 B1
DATED : July 9, 2002
INVENTOR(S) : Mats Lagmanson

It is certified that error appears in the above-identified patent and that said Letters Patent is hereby corrected as shown below:

<u>Title page,</u>
Item [75], please delete "Bertilsooh" and insert -- Bertilsson --

<u>Column 13,</u>
Line 8, please delete "contract" and insert -- contact -- therefor.

Signed and Sealed this

Twentieth Day of August, 2002

Attest:

JAMES E. ROGAN
Attesting Officer     Director of the United States Patent and Trademark Office